US011955756B2

(12) United States Patent
Leiminger et al.

(10) Patent No.: US 11,955,756 B2
(45) Date of Patent: Apr. 9, 2024

(54) ELECTRIC TERMINAL HAVING SECONDARY LATCHING DEVICE

(71) Applicant: TE Connectivity Germany GmbH, Bensheim (DE)

(72) Inventors: Daniel Leiminger, Woert (DE); Jochen Brandt, Woert (DE); Andreas Oettle, Woert (DE); Stefan Raab, Woert (DE); Ulrich Lechler, Woert (DE); Marina Hertlein, Woert (DE); Florian Staufinger, Woert (DE); Jiri Konrad, Woert (DE); Andreas Merkle, Woert (DE); Julia Stegmeier (nee Kirschbaum), Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 251 days.

(21) Appl. No.: 17/500,285

(22) Filed: Oct. 13, 2021

(65) Prior Publication Data

US 2022/0115791 A1 Apr. 14, 2022

(30) Foreign Application Priority Data

Oct. 13, 2020 (DE) ......................... 102020126888.2
Jul. 2, 2021 (DE) ......................... 102021117168.7

(51) Int. Cl.
*H01R 4/48* (2006.01)
*H01R 4/18* (2006.01)

(52) U.S. Cl.
CPC ................. *H01R 4/48* (2013.01); *H01R 4/18* (2013.01)

(58) Field of Classification Search
CPC .......... H01R 4/48; H01R 4/184; H01R 4/185; H01R 4/18; H01R 4/28; H01R 4/20;
(Continued)

(56) References Cited

U.S. PATENT DOCUMENTS 5,951,336 A * 9/1999 Seko .................... H01R 13/432
439/748
5,971,816 A * 10/1999 Chaillot ............... H01R 13/113
439/852
(Continued)

FOREIGN PATENT DOCUMENTS

DE 198 12 935 A1 1/1998
DE 102007040937 B3 1/2009
(Continued)

OTHER PUBLICATIONS

Korean Office Action dated Jul. 11, 2023, with English translation thereof, corresponding to Application No. 10-2021-0134987, 14 pages.
(Continued)

*Primary Examiner* — Harshad C Patel
(74) *Attorney, Agent, or Firm* — Barley Snyder

(57) ABSTRACT

An electric terminal including a contact section having a locking lance locking the electric terminal in a connector housing of an electric connector and a transition section extending from the contact section and having a secondary latching with a secondary latching device latching the electric terminal in the connector housing. The locking lance is axially additionally secured in the contact section away from an attachment of the locking lance to the contact section and/or a plurality of side walls of the electric terminal are closed by a circumferential connection in the secondary latching device.

20 Claims, 2 Drawing Sheets

(58) Field of Classification Search
CPC ........ H01R 4/023; H01R 4/022; H01R 4/021; H01R 4/02
See application file for complete search history.

(56) References Cited

U.S. PATENT DOCUMENTS

| | | | | |
|---|---|---|---|---|
| 6,106,339 | A * | 8/2000 | Nagai | H01R 13/432 439/744 |
| 6,165,026 | A | 12/2000 | Sugie et al. | |
| 7,950,972 | B1 * | 5/2011 | Chen | H01R 13/111 439/852 |
| 7,976,351 | B2 * | 7/2011 | Boemmel | H01R 13/432 439/748 |
| 9,153,879 | B2 * | 10/2015 | Frimmersdorf | H01R 43/16 |
| 9,799,976 | B2 * | 10/2017 | Lehner | H01R 13/04 |
| 10,122,108 | B2 * | 11/2018 | Bhagyanathan Sathianathan | H01R 13/187 |
| 10,522,934 | B2 * | 12/2019 | Zhang | H01R 24/28 |
| 10,658,796 | B2 | 5/2020 | Luttermann | |
| 11,152,730 | B2 * | 10/2021 | Nishii | H01R 13/115 |
| 11,699,869 | B2 * | 7/2023 | Chen | H01R 13/113 439/852 |
| 2014/0322995 | A1 * | 10/2014 | Frimmersdorf | H01R 4/28 29/874 |
| 2015/0140876 | A1 * | 5/2015 | Lehner | H01R 43/16 439/891 |
| 2017/0155205 | A1 | 6/2017 | Zhang et al. | |
| 2020/0176917 | A1 | 6/2020 | Zhou | |
| 2021/0167537 | A1 * | 6/2021 | Nishii | H01R 13/113 |

FOREIGN PATENT DOCUMENTS

| | | | |
|---|---|---|---|
| DE | 20 2017 101 632 | U1 | 6/2018 |
| DE | 10 2016 116 937 | B4 | 10/2019 |
| DE | 10 2019 007 795 | A1 | 6/2020 |
| EP | 2797173 | A1 | 10/2014 |
| FR | 3 044 172 | A1 | 5/2017 |
| JP | H1167321 | A | 8/2000 |
| JP | 2010537391 | A | 12/2010 |
| JP | 3225112 | U | 2/2020 |
| WO | 2009027317 | A2 | 3/2009 |
| WO | 2014/127817 | A1 | 8/2014 |
| WO | 2015/110661 | A1 | 7/2015 |

OTHER PUBLICATIONS

Japanese Office Action dated Jun. 13, 2023, with English translation thereof, corresponding to Application No. 2021-166553, 10 pages.
German Office Action, App. No. 10 2020 126 888.2, dated Jul. 16, 2021, 5 pages.
Abstract of FR 3044172, dated May 26, 2017, 1 page.
Abstract of DE 202017101632U1, dated Jun. 22, 2018, 1 page.
Extended European Search Report, Application No. 21202437.6-1201, dated Mar. 2, 2022, 14 pages.
Office Action from the Japanese Patent Office dated Nov. 15, 2022, corresponding to Application No. 2021-166553 with English translation, 13 pages.

* cited by examiner

ELECTRIC TERMINAL HAVING SECONDARY LATCHING DEVICE

CROSS-REFERENCE TO RELATED APPLICATIONS

This application claims the benefit of the filing date under 35 U.S.C. § 119(a)-(d) of German Patent Application No. 102020126888.2, filed on Oct. 13, 2020 and German Patent Application No. 102021117168.7, filed on Jul. 2, 2021.

FIELD OF THE INVENTION

The present invention relates to an electric terminal and, more particularly, to a contact device for the automotive sector.

BACKGROUND

In the electrical sector (electronics, electrical engineering, electrics, electric energy technology, etc.), a large number of electric connector devices; socket, pin and/or hybrid connectors, etc. are known—referred to below as (electrical) connectors (also: mating connectors)—that serve for transmitting electrical currents, voltages, signals and/or data with a wide range of currents, voltages, frequencies and/or data rates. In the range of low, medium or high voltages and/or currents, and in particular in the automotive sector, such connectors must ensure transmission of electrical power, signals and/or data permanently, repeatedly and/or after a comparatively long time of inactivity for a short time in mechanically stressed, warm, possibly hot, contaminated, damp and/or chemically aggressive environments. Due to a wide range of applications, a large number of specially designed connectors are known.

Such a connector and, if applicable, its associated or higher-level housing (e.g. in the case of a connector device), can be attached to an electrical wire, a cable, a cable harness, etc. —referred to below as a pre-assembled (electrical) cable (also: electrical entity)—or at/in an electrical device, such as e.g. at/in a housing, at/on a leadframe, at/on a circuit board, etc., of a (power) electrical, electrooptical or electronic component or a corresponding aggregation, etc. (electrical entity).

If a connector (with/without housing) is situated on a wire, a cable or a cable harness, this is also called a flying (plug) connector or a plug, a socket or a coupling; if it is situated at/in an electrical, electrooptical or electronic component, aggregation, etc., this is also called a connector device, such as e.g. a (built-in/mounted) connector, a (built-in/mounted) plug or a (built-in/mounted) socket. Furthermore, a connector at such a device is often referred to as a (plug) receptacle, pin header, pin strip or header. In the context of electrical power engineering (generating, converting, storing and transporting high-voltage electrical current within electricity grids, optionally with three-phase high-voltage transmission), one speaks here of cable fittings because of their comparatively complex structure.

Such a connector must ensure a proper transmission of electricity, wherein mutually corresponding and partially complementary connectors (connector and mating connector) usually having locking devices and/or fastening devices for permanent but usually releasable locking and/or fastening of the connector at/in the mating connector or vice versa. Furthermore, an electrical connecting device for a connector, e.g. comprising or at least having: a contact device (terminal; usually in one piece having several or two parts, or materially in one piece, e.g. a (crimp) contact device), must be held securely therein.

Efforts are always being made to improve electrical connectors, to make them smaller, and/or to design them in a less expensive manner. The advancing miniaturization is also not stopped here by the cross sections of the cables and/or the involved terminals. Efforts are thus being made to reduce the dimensions of cables and their terminals, in order to reduce an amount of installation space, in order to make it possible for a line cross section to be utilized as satisfactorily as possible in the case of a given maximum current carrying capacity, and in order to save resources, in particular copper. Furthermore, miniaturization results in a desired weight saving.

SUMMARY

An electric terminal including a contact section having a locking lance locking the electric terminal in a connector housing of an electric connector and a transition section extending from the contact section and having a secondary latching with a secondary latching device latching the electric terminal in the connector housing. The locking lance is axially additionally secured in the contact section away from an attachment of the locking lance to the contact section and/or a plurality of side walls of the electric terminal are closed by a circumferential connection in the secondary latching device.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
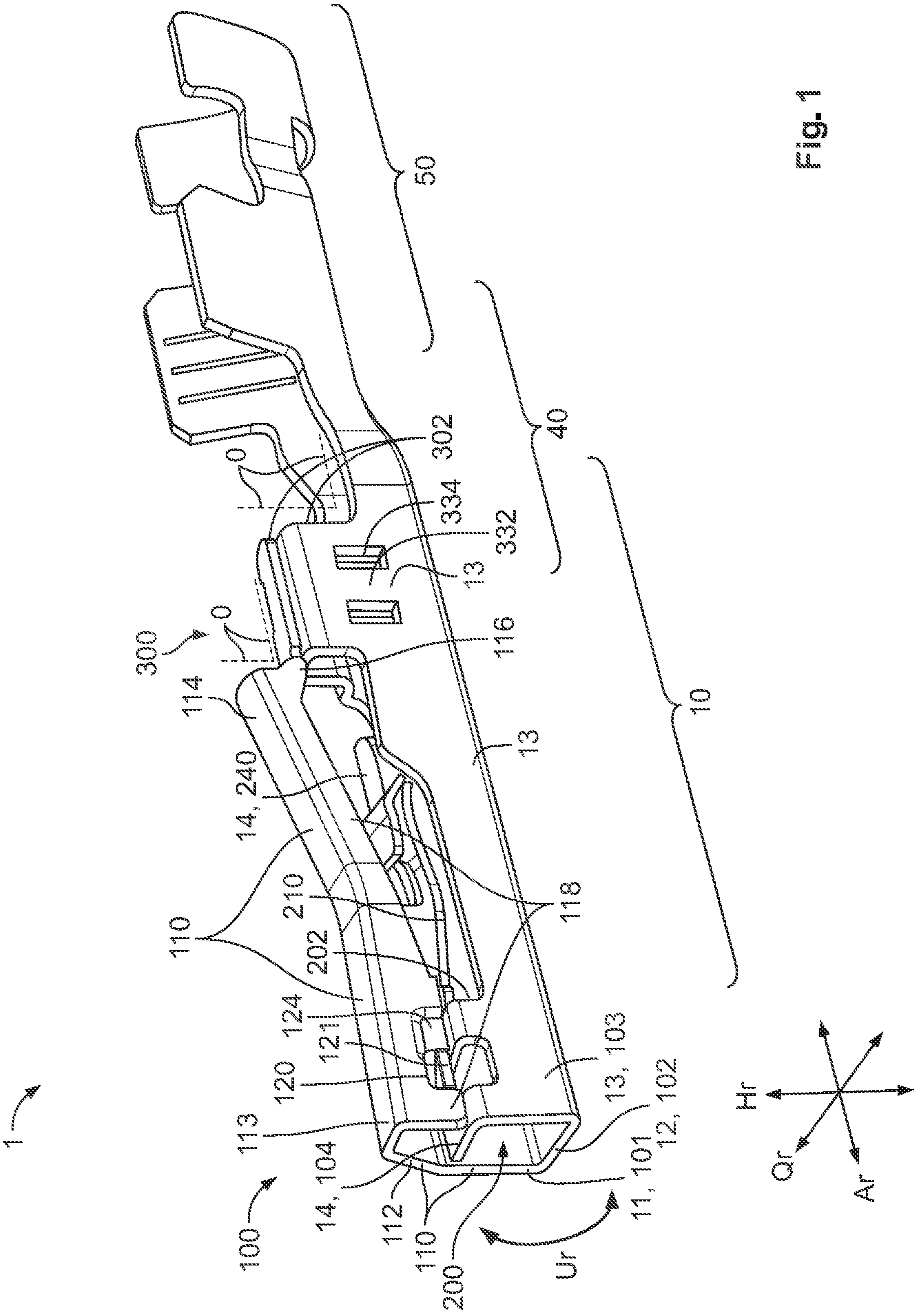
FIG. 1 is a perspective view of an electric terminal according to an embodiment.

The invention is explained in greater detail in the following on the basis of exemplary embodiments with reference to the appended drawings, which are diagrammatic and not to scale. Portions, elements, component parts, units, components and/or patterns which have an identical, unique or analogous configuration and/or function are labelled with the same reference signs in the figures. Furthermore, a possible alternative which is not described, is not shown in the drawings and/or is not definitive, a static and/or kinematic reversal, a combination, etc. with respect to the exemplary embodiments of the invention or a component, a pattern, a unit, a component part, an element or a portion thereof, can be gathered, furthermore, from the figures.

In the case of the invention, a feature (portion, element, component part, unit, component, function, variable, etc.) can be of positive configuration (that is to say, present) or of negative configuration (that is to say, absent). In this specification, a negative feature is not explained explicitly as a feature if value is not placed on it being absent according to the invention; that is to say, the invention which is actually made and is not constructed by way of the prior art consists in omitting the feature.

A feature of this specification can be used not only in a specified manner and/or way, but rather also in another manner and/or way (isolation, combination, replacement, addition, on its own, omission, etc.). It is possible, in particular, to replace, add or omit a feature in the patent claims and/or the description on the basis of a reference sign and a feature which is assigned to it or vice versa. Moreover, a feature in a patent claim can be interpreted and/or specified in greater detail as a result.

The features of the description can also be interpreted as optional features (in view of the (initially mostly unknown) prior art); that is to say, each feature can be considered to be an optional or arbitrary feature, that is to say a feature which is not mandatory. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. Furthermore, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in greater detail in the following text on the basis of exemplary embodiments of the one embodiment of one variant of an electric terminal 1, configured as a contact device 1, of the next generation, in particular of a NanoMQS terminal 1 (MQS: Micro Quadlok System) for the automotive sector. NanoMQS terminals 1, in various embodiments, are suitable for cables with line cross sections of less than 0.35 $mm^2$, in an embodiment of less than 0.30 $mm^2$ or 0.25 $mm^2$. Although the invention is described and illustrated further in greater detail by way of exemplary embodiments, the invention is not restricted by way of the disclosed exemplary embodiments, but rather is of more fundamental nature.

Other variations can be derived herefrom without departing from the scope of protection of the invention. The invention can be used in general in the electrical sector in the case of an electrical entity. One exception is formed here by terrestrial electrical power engineering.

The drawing shows only those spatial portions of the subject matter of the invention which are necessary for understanding of the invention. Designations such as connector and mating connector, terminal and mating terminal, etc. are to be interpreted synonymously, that is to say can optionally be swapped in each case among one another.

In the following text, a construction of the terminal 1 is described in greater detail with reference to the drawing, it being possible for the terminal 1 to be provided in a connector housing (electrical connector 0). Here, the terminal 1 can be latched or locked in a primary and secondary manner in the connector housing of the connector 0, which is shown in FIG. 1 using dashed lines. In the present case, the terminal 1 is configured as a socket terminal 1 and is configured here, in particular, as a crimp terminal 1, but can also be configured as a pin, prong or tab terminal 1.

In the axial direction Ar ((mating) plug-in direction) of the terminal 1 from the front (on the left in FIG. 1), the terminal 1 comprises an electromechanical contact section 10 for an electric mating terminal, a mechanical-electrical transition section 40, and an electromechanical connector section 50 (crimp portion) for an electric cable. In the present case, the contact section 10 is configured as a socket contact section 10 with a (first) (side) wall 11, a (bottom) wall 12, a (second) (side) wall 13 and an (intermediate cover) wall 14 of the terminal 1.

In the case of a non-socket terminal, that is to say, for example, a pin, prong or tab terminal, the function of the socket contact section 10 as a socket is dispensed with; instead, an alternative contacting device is provided, such as, for example, a pin, prong or tab. The construction of a terminal of this type is analogous with respect to the socket terminal, a polarization 100 (explained in the following) of the terminal 1 being established not at a front free end of the terminal 1, but behind an actual contacting device (here, an actual socket) of the terminal 1 in the axial direction Ar.

A polarization 100 of the terminal 1 is understood to mean, for example, an entire axial portion of the terminal 1 which, in addition to other tasks, such as, for example, primary latching, rigidities, etc., serves for polarization or encoding, that is to say correctly oriented plugging of the terminal 1 into a connector housing. In the case of a terminal 1 which is configured, for example, as a socket terminal, the polarization can be a plug-in face-side free longitudinal end portion of the terminal and, in the case of a terminal which is configured, for example, as a pin terminal, can be a longitudinal center portion of said terminal.

Figure 2:
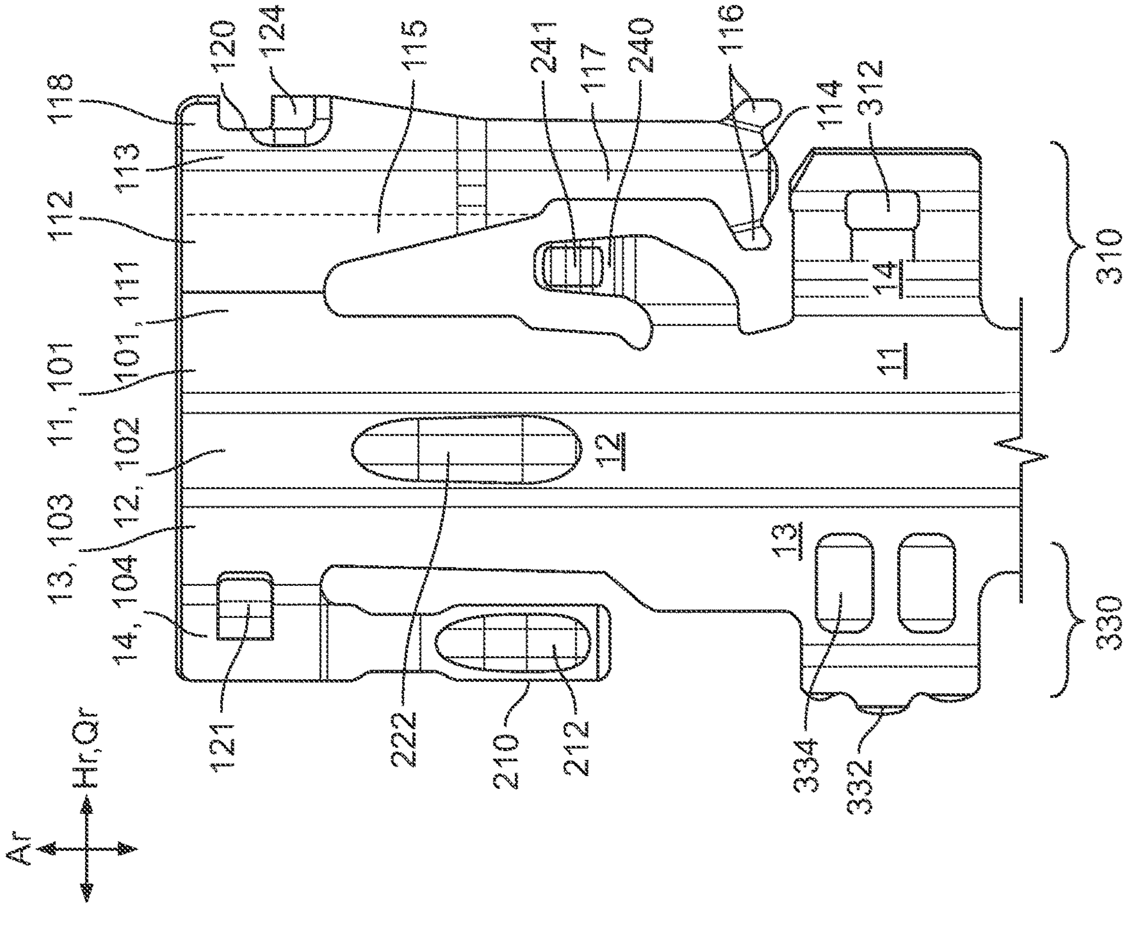
FIG. 2 is a plan view of the electric terminal of FIG. 1 as a layout.

The terminal 1, as shown in FIGS. 1 and 2, has a box-shaped polarization 100 in the shown embodiment in a front region of the contact section 10 (socket terminal 1) or as a transition section 40 or as a part of the transition section 40 (pin/prong/tab terminal). Here, the "box" of the polarization 100 can be, for example, open at one point on one side or else possibly closed. Reference is made in the following text only to the socket terminal 1 which is shown in the drawing. The polarization 100 has a (first) (side) wall 101, a (bottom) wall 102, a (second) (side) wall 103 and an (intermediate cover) wall 104. Here, the walls 101, 102, 103, 104 of the polarization 100 are likewise walls 11, 12, 13, 14 of the terminal 1.

The terminal 1 comprises a resilient locking lance 110 which is attached to the polarization 100 or is incorporated partially into the polarization 100, as shown in FIG. 1. Here, in its longitudinal extent Hr, Ar, the locking lance 110 comprises a bound, first (longitudinal) portion and a free, second (longitudinal) portion, the locking lance 110 being attached with its first portion on one side on to the (side) wall 11, 101 of the polarization 100. Here, the two portions are set up to be angled and oriented differently in the terminal 1 than a locking lance 110.

Starting from a root laterally (remote side of the terminal 1 on the left in FIG. 1) on/in the polarization 100, the bound, first portion first of all extends substantially in the upward direction Hr of the terminal 1, in a vertically upward manner (towards the top in FIG. 1). In the shown embodiment, directly subsequent thereto, the first portion curves in the circumferential direction Ur of the terminal 1 over the actual terminal 1 or the contact section 10, and merges there into the second portion.

Here, the first portion runs in the upward direction Hr, and then in the upward direction Hr and transverse direction Qr (circumferential direction Ur) of the terminal 1. A width (averaged over the upward direction Hr) of the first portion in the axial direction Ar can be greater than the width (averaged over the axial direction Ar) of the second portion in the transverse direction. The axial direction Ar ((mating) plug direction), the transverse direction Qr and the upward direction Hr of the terminal 1 all lie substantially perpendicularly to one another. Here, the axial direction Ar is that direction in which the terminal 1 runs with its main direction of extent. The cross sections of the terminal 1 lie in the transverse direction Qr and upward direction Hr, the crimp flanks of the terminal 1 running substantially in the upward direction Hr in a non-crimped state of said terminal 1 as a crimp terminal.

The free, second portion of the locking lance 110 lies eccentrically as a (cover) wall on the outside and at the top on/in the terminal 1, the second portion adjoining the first portion integrally. Starting from the first portion, the second portion runs first of all substantially in the axial direction Ar and, subsequent to this, in the axial direction Ar and upward direction Hr of the terminal 1. At least one holding device 116, in particular a holding tab 116, is provided at a free end of the second portion, by which holding device 116 the locking lance 110 can be locked on a primary latching in the connector housing 0.

The terminal 1 can be configured in such a way that, when a compressive force is applied to the locking lance 110, e.g. from above, a/the first portion of the terminal is substantially subjected to bending in the axial direction Ar (axial direction as bending axis) and a/the second portion of the terminal 1 is substantially subjected to bending in a transverse direction Qr (transverse direction as bending axis) of the terminal 1. Furthermore, the terminal 1 can be configured in such a way that, when a tensile force is applied in the axial direction Ar to the terminal 1 which is established here e.g. actually or ideally in a connector housing, a/the first portion of the terminal 1 is substantially subjected to torsion in the upward direction (upward direction as torsion axis) and a/the second portion of the terminal 1 is substantially subjected to bending in the transverse direction (transverse direction as bending axis).

In an embodiment, the locking lance 110 can be configured as follows. Once again starting from the root laterally on/in the polarization 100, the locking lance 110 extends with a first upward portion 111 substantially exclusively in the upward direction Hr. Said upward portion 111 partially forms a (first) (side) wall 11, 101; 111 of the terminal 1 and of the polarization 100.

Directly subsequent thereto, the locking lance 110 has a second upward portion 112 shown in FIG. 1 which partially forms a (first) (side) wall 11, 101; 112 of the terminal 1 and of the polarization 100. Here, the second upward portion 112 runs on the outside obliquely on the terminal 1 in the upward direction Hr and transverse direction Qr (circumferential direction Ur), and forms an actual polarization device 112 of the polarization 100 here (deviation from a substantially symmetrical, for example rectangular mating face).

Once again directly subsequent thereto, the locking lance 110 has a first or bound axial portion 113 shown in FIG. 1 with an at least partially U-shaped cross section. The first axial portion 113 forms a (cover) wall 113 of the terminal 1 and of the polarization 100. Once again directly subsequent thereto, the locking lance 110 has a second or free axial portion 114 with an at least partially U-shaped cross section. The second axial portion 114 likewise forms a (cover) wall 114 of the terminal 1 and of the polarization 100.

A reinforcement region 115 can be established integrally in the locking lance 110 between the second upward portion 112 and the bound axial portion 113. The locking lance 110 itself can have at least one or two (side) walls 117, 118 (extent in the axial direction Ar and the upward direction Hr) (U-shaped cross section). Here, at least one or precisely one (side) wall 117, 118 can be cut out at least partially (not reference sign 120).

According to the invention, as shown in FIG. 1, the locking lance 110, apart from its attachment to the contact section 10 by its bound, first portion (at the back left in FIG. 1), is established such that it is additionally axially secured (at the front left in FIG. 1) in the contact section 10. Here, the additional axial securing lies mainly or substantially opposite the bound, first portion in the transverse direction Qr. Here, the additional axial securing can be configured as a connection which is mechanical (FIG. 1) and/or single-piece in material terms.

The mechanical connection can be configured as an exclusively mechanical connection. A single-piece connection in material terms is, for example, a weld (welded point), a soldered connection or an adhesive bond. The additional axial securing can be effective in precisely one, at least one or the two axial directions of the terminal 1. The additional axial securing can be established in the contact section 10 in a manner which lies opposite the attachment of the locking lance 110 to the contact section 10. The additional axial securing lies opposite in the transverse direction Qr of the terminal 1 with regard to the attachment of the locking lance 110. An axial offset of the two axial lockings (attachment of the locking lance 110 to the contact section 10, and additional axial securing) of the locking lance 110 can of course be used.

In this exemplary embodiment shown in FIG. 1, the additional axial securing of the locking lance 110 is established by a mechanical axial locking 120, 121, the axial locking 120, 121 being configured in the present case as a latching of two locking devices 120, 121 which engage into one another. The locking devices 120, 121 are, in an embodiment, configured as a locking recess 120, (121) and a locking lug 121, (120); the reference signs between parentheses are intended to indicate that it is primarily unimportant whether a locking device 120, 121 is configured as a locking recess 120, (121) or a locking lug 121, (120). The locking device 120 is shown as a locking recess 120 and the locking device 121 is shown as a locking lug 121, however, in the shown embodiment. The mechanical axial locking 120, 121 can be configured as a latching, locking or arresting of the locking lance 110 to the contact section 10. The mechanical axial locking 120, 121 can be set up by way of and/or by a wall of the contact section 10. Here, the axial locking 120, 121 can be substantially affected by play (clearance fit) or can be substantially not affected by play (transition fit, oversize fit) in the contact section 10.

In the exemplary embodiment which is shown of the terminal 1 in FIG. 1, the contact section 10 or the (intermediate cover) wall 104 and also, to a smaller proportion (approximately in the dimensions of the material thickness) the (second) (side) wall 103 firstly have a locking device 121 which is configured as a locking lug 121. Secondly, the locking lance 110 or there, in particular, the first, bound axial portion 113 and/or there the second (side) wall 118 have/has the locking device 120 which is configured as a locking recess 120. In a free top view (plane of the axial direction Ar and of the transverse direction Qr) of the terminal 1, the locking device 120, 121 are established to be substantially flush and/or the locking lug 121 fits at least partially in a complementary manner into the locking recess 120 (locating fit, see above).

In the case of a mechanical axial locking 120, 121 which is established in the terminal 1, the locking devices 120, 121 engage into one another, for which purpose the locking lug 121 is bent out of its plane into the locking recess 120. A reinforcement device 124 can be established adjacently with respect to the locking recess 120, which reinforcement device 124 can form an edge of the locking recess 120; that is to say, the reinforcement device 124 "extends" into the locking recess 120. The reinforcement device 124 is established between the locking recess 120 and a free end of the locking lance 110 at/in the locking lance 110 or the first, bound axial portion 113 or the second (side) wall 118. The reinforcement device 124 can be set up in front of the locking recess 120 in the pull-out direction of the terminal 1. Here, the pull-out direction (pull-off direction) is that direction, in which a pulling action is exerted on an electrical wire which is connected to the terminal 1, in order to pull the terminal 1 out of the connector housing (unintentionally). The reinforcement device 124 can be a reinforcement bead or a reinforcement stamped portion.

The at least one additional axial securing is possibly active only from a certain mechanical force in the axial direction Ar on the above-described locking lance 110; that is to say, for example, the locking lug 121 is established with play in the locking recess 120. That is to say, the terminal 1 is designed for this case in such a way that the additional axial securing is active only in the case of a defined pull-out force on the locking lance 110 being exceeded, for example in a manner which emanates from a cable which is connected electromechanically to the terminal 1. In the case of rearwardly directed tensile forces on the terminal 1 which are smaller than the said pull-out force, the additional axial securing is not yet active then.

An axial movement of the entire locking lance 110 can be stopped by the additional axial securing, as a result of which a durability of the terminal 1 is increased. Here, the locking lance 110 can of course still be deformed elastically and possibly plastically. According to the invention, a considerable increase in the durability of the terminal 1 is shown in comparison with an identical terminal 1 without the additional axial securing or without the additional mechanical axial locking 120, 121.

The terminal 1 can comprise a secondary latching 300, shown in FIG. 1, in a rear region of the contact section 10 and/or a front region of the transition section 40 (socket terminal 1) or in the transition section 40 (pin/prong/tab terminal) (the contact section 10 and transition section 40 can overlap). In the following, reference is once again made only to the socket terminal 1 which is shown in the drawing. In an analogous manner with respect to the terminal 1 or the polarization 100, the secondary latching 300 comprises a (first) (side) wall 11, a (bottom) wall 12, a (second) (side) wall 13 and an (intermediate cover) wall 14. Here, the (intermediate cover) wall 14 or a remaining portion of it can also be absent (second circumferential section 330 in an analogous manner with respect to the first circumferential section 310).

Figure 3:
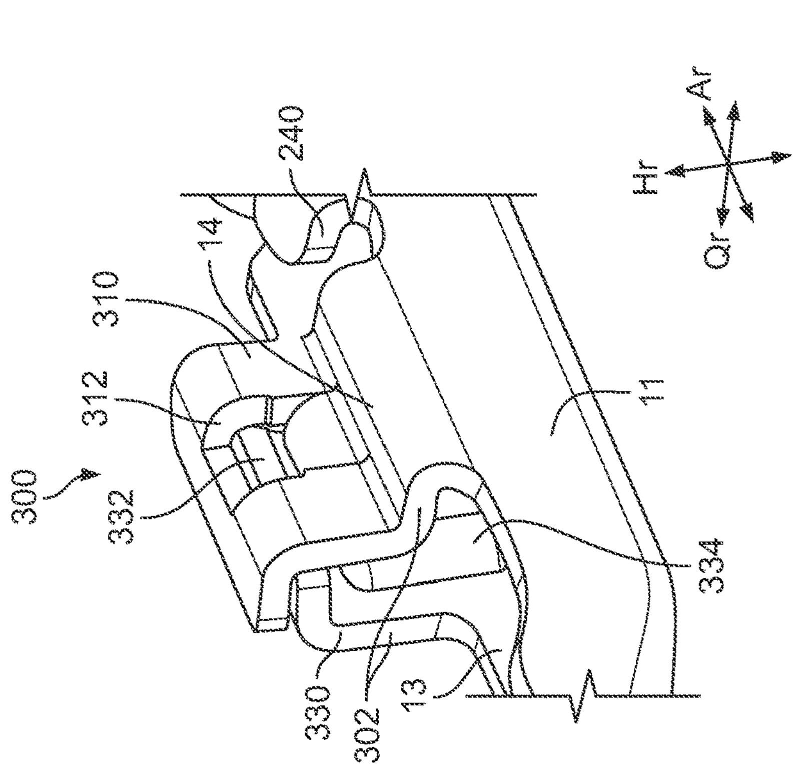
FIG. 3 is a detail perspective view of a secondary latching of the electric terminal.

A rigid secondary latching device 302 shown in FIGS. 1 and 3 that is configured, in particular, as a latching box 302 is established at/in the contact section 10 and/or transition section 40 between the (intermediate cover) wall 14 and the second (side) wall 13. In particular, the latching box 302 is configured by a first circumferential section 310 of the terminal 1, a first closure device 310, and a second circumferential section 330 of the terminal 1, a second closure device 330. The latching box 302 is hollow on the inside, and the cavity can be greater than or equal to, in the transverse direction Qr, possibly apart from a constricted portion (reinforcement device 334), a sheet metal thickness of the terminal 1. The cavity is defined in such a way that it does not comprise the material of the transition section or of the terminal 1. A latching box 302 of this type can be established simply in a terminal. A terminal which is plugged into a connector housing in a falsely positive manner can be detected satisfactorily by a worker or a machine on account of stretching of the latching box 302.

In the layout of the terminal 1, shown in FIG. 2, the two circumferential sections 310, 330 are of lug-shaped configuration and form firstly (first circumferential section 310) an extension of the (first) (side) wall 11 or the (intermediate cover) wall 14 and secondly (second circumferential section 330) an extension of the (second) (side) wall 13. Here, the first circumferential section 310 has a first closure device 312, a (passage) recess 312 or a lock in accordance with the key/lock principle in an embodiment, and the second circumferential section 330 has a second closure device 322, a lug 332 or a key in accordance with the key/lock principle in an embodiment. The first closure device 312 and the second closure device 322 are a circumferential connection in the secondary latching device 302.

In a ready-for-use state of the terminal 1, shown in FIGS. 1 and 3, the two circumferential sections 310, 330 are bent towards one another and are plugged into one another on the longitudinal end portions (plug-in connection), with the result that the latching box 302 which is at least partially hollow on the inside is configured. Here, the circumferential plug-in connection can transmit mechanical forces in at least one, precisely one or the two circumferential direction/directions, axial direction/directions and/or radial direction/directions. Here, the lug 332 or the key can find space in a positively locking manner in the (passage) recess 312 or the lock.

Instead of a mechanical circumferential connection, in addition or as an alternative a circumferential connection which is single-piece in material terms can also be established between the circumferential sections 310, 330. A connection which is single-piece in material terms is, for example, a weld (welded point), a soldered connection or an adhesive bond.

The latching box 302 or the circumferential connection of the circumferential sections 310, 330 can be established in the transverse direction Qr of the terminal 1 in a side region in the contact section 10 or in the transition section 40. The circumferential connection can be effective in precisely one, at least one or the two circumferential directions of the terminal 1. Establishing in a relevant central portion (possibly centrally divided (intermediate cover) wall 14)) can of course be used. Furthermore, the latching box 302 can have a reinforcement device 334, in particular a reinforcement bead 334 or a reinforcement stamped recess, as shown in FIGS. 1 and 3.

The latching box 302 can be established in the terminal 1 in such a way that the second circumferential section 330 extends substantially rectilinearly in the upward direction Hr out of the (second) (side) wall 13 and is bent over at approximately a right angle on its longitudinal end portion. In a manner which lies opposite in the transverse direction Qr, the first circumferential section 310 extends substantially rectilinearly in the upward direction Hr out of the (intermediate cover) wall 14, and is likewise bent over in an approximately right angle on its longitudinal end portion. This can of course also be of reversed configuration. Furthermore, it is possible for the first circumferential section 310 to be of analogous configuration with respect to the second circumferential section 330, or for the second circumferential section 330 to be of analogous configuration with respect to the first circumferential section 310.

Those longitudinal end portions of the circumferential section 330 which lie opposite one another are arranged so as to bear against one another in the upward direction Hr, the lug 332 or the key engaging into the (passage) recess 312 or the lock. The (second) (side) wall 13 has at least one reinforcement stamped recess or reinforcement bead 334 which runs, in particular, in the upward direction Hr.

In the embodiment shown in FIG. 1, the contact section 10 has a contact region 200 which is configured as a socket 200 with a contact chamber 202. Starting from the (intermediate cover) wall 14 of the polarization 100, a resilient contact spring 210 of simple configuration which is designed as a leaf spring 210 extends inwards into the contact chamber 202. Here, the leaf spring 210 is attached integrally to the terminal 1 only on a longitudinal end portion ((intermediate cover) wall 14). A spring lamella which is attached integrally on two sides can of course also be used as a contact spring 210. Substantially or mainly all the cross sections of the contact spring 210 are configured as simple cross sections, in particular substantially or mainly rectangular cross sections. That is to say, furthermore, the contact spring 210 does not have, for example, an L-shaped profile.

The contact spring 210 is established such that it can be supported on its free longitudinal end portion by a supporting lug 240 in the terminal 1, shown in FIGS. 1 and 3. The supporting lug 240 is a portion of the (intermediate cover) wall 14, which portion lies further rearwards. At least one fixed anvil 212 for the mating terminal and/or at least one seating bead 214 are/is established in the contact spring 210. Furthermore, at least one fixed anvil 222 for the mating terminal is established in the (bottom) wall 12 of the terminal 1.

The fixed anvil 222 may be established as a depression in the bottom wall 12, which depression is stamped into the bottom wall 12. At least one or precisely one fixed anvil 212 can be established for a/the mating terminal in the contact spring 210. Precisely one stamped seating recess or seating bead 241 can be established in the supporting lug 240. The stamped seating recess or seating bead 241 defines a plain bearing point or a small plain bearing region of the free longitudinal end portion of the contact spring 210 on the inside in the terminal 1 with respect to the supporting lug 240.

This results in an improved electric contact region with an improved ratio of a highest plug-in force to a normal force which is active for a mating terminal. Furthermore, a general customer request can be met for a downwardly directed contact force (direction of gravity) and an upwardly directed normal force. Furthermore, a possible, simple construction of the contact chamber results in a flexible design in accordance with technical requirements (modifications) of a customer and/or its product. A leaf spring attached on one side as a contact spring 210 in conjunction with a supporting lug for a free longitudinal end portion of the leaf spring results in a trajectory which is improved in terms of plug-in force.

For relevant loading directions on the miniaturized terminal 1, there is a high stability of the terminal 1 in relation to a retaining force of the locking lance 110 (first contact securing) and a high stability of the terminal 1 in the region of the secondary latching 300 (plug-in directions of a second contact securing: from the right, the top or the left). The resistance forces of the terminal 1 are increased considerably by the additional axial securing according to the invention of the locking lance 110 in the contact section 10 and the circumferential connection according to the invention of the side walls of the secondary latching device 302. The terminal 1 and said two regions according to the invention of the terminal 1 can be manufactured rapidly and reliably in relation to manufacturing requirements. It is of course possible according to the invention for only one of the two regions to be set up on/in a terminal 1.

The extension of the locking lance 110 into a side wall of the terminal 1 or its polarization 100 results in an increased spring length of the locking lance 110 and a smaller relaxation of the locking lance 110, in particular in the case of first-time locking of the terminal 1 in a connector housing 0. Furthermore, as a result, an inner mutual displacement movement of the locking lance 110, for example in the case of a presence of a holding force or a pull-out force, is defined in an improved manner. For example, in the case of a presence of a high pull-out force or even a rip-out force on the terminal 1, a greater influence can be made as a result on a failure behavior of the locking lance 110 and therefore of the terminal 1 than in the prior art. Moreover, higher holding forces of the locking lance 110 result in comparison with comparable terminals in the prior art.

In embodiments, the terminal 1 can be configured in one part (in one piece and in two/several parts). That is to say, the terminal 1 can be separated by hand or by a tool and without damage to its two or more individual parts. A cohesiveness of the terminal 1 takes place by a non-positive and/or positively locking connection. Furthermore, the terminal 1 can be configured in one piece. That is to say, the terminal 1 cannot be separated into its individual parts simply by hand or by a tool and possibly not without damage. A cohesiveness takes place by a non-positive and/or positively locking connection and possibly an integrally joined connection.

Furthermore, the terminal 1 can be configured in one piece in material or adhesive terms. That is to say, its individual parts are fixed to one another in an integrally joined manner (welding, soldering, adhesive bonding), it not being possible for the terminal 1 to be separated into its individual parts without damage. Furthermore, there can be a cohesiveness by a non-positive and/or positively locking connection. Moreover, the terminal 1 can be of single or integral configuration. That is to say, there is only one single component (the terminal 1) which can be separated only with destruction thereof. The terminal 1 is manufactured from a single piece which for its part should necessarily be integral, etc. An inner cohesiveness takes place by means of adhesion and/or cohesion, and the material of the terminal is of homogeneous, amorphous and/or isotropic configuration here.

The entity according to the invention has a terminal 1 according to the invention. Here, for example in addition to an entity housing, the entity can have, furthermore, at least one mechanical, electrical, electronic, optical and/or fluidic apparatus or device. An entity of this type can (also) be configured, for example, as an electrical connector, a device (electrical connector device), a (pre-)assembled cable, an assembly, a printed circuit board, a component, a module, a unit, an instrument, an appliance, a system, etc.

What is claimed is:

1. An electric terminal, comprising:

a contact section having a locking lance locking the electric terminal in a connector housing of an electric connector; and a transition section extending from the contact section and having a secondary latching with a secondary latching device latching the electric terminal in the connector housing, a downwardly extending free end edge of a side wall of the locking lance is axially additionally secured by a mechanical axial locking to a wall of a socket of the contact section away from an attachment of the locking lance to the contact section, the secondary latching device has a pair of circumferential sections bent toward one another in a circumferential direction of the electric terminal, end portions of the circumferential sections bent toward one another are connected by a mechanical circumferential connection.

2. The electric terminal of claim 1, wherein the locking lance is axially additionally secured in an axial direction of the terminal by a connection that is mechanical and/or in a single piece, the locking lance is axially additionally secured in the contact section opposite the attachment of the locking lance to the contact section.

3. The electric terminal of claim 1, wherein the mechanical axial locking has a pair of locking devices engaging one another, the locking devices include a locking recess formed in the free end edge of the side wall of the locking lance and a locking lug complementary to the locking recess formed by the wall of the socket.

4. The electric terminal of claim 3, further comprising a reinforcement device adjacent to the locking recess, the reinforcement device is disposed in front of the locking recess in a pull-out direction of the electric terminal.

5. The electric terminal of claim 4, wherein the reinforcement device forms an edge of the locking recess and comprises at least one of a reinforcement bead or a reinforcement stamped portion formed on or into the free end edge of the side wall of the locking lance.

6. The electric terminal of claim 1, wherein the secondary latching device is a latching box in the transition section, a cavity in the latching box is greater than or equal to a sheet metal thickness of the transition section.

7. The electric terminal of claim 6, wherein the latching box has a reinforcement bead or a reinforcement stamped recess formed on or into a wall thereof.

8. The electric terminal of claim 1, wherein the circumferential connection is established in a transverse direction in the transition section.

9. The electric terminal of claim 8, wherein a first circumferential section of the circumferential sections has a recess and a second circumferential section of the circumferential sections has a lug.

10. The electric terminal of claim 9, wherein the circumferential sections are plugged into one another by a plug-in connection, the lug is received in the recess in a substantially positive locking manner on a top of the second latching device.

11. The electric terminal of claim 1, further comprising a polarization with the locking lance that is mechanically integrated into the terminal on one side only.

12. The electric terminal of claim 1, wherein the locking lance has a first portion and a second portion between a bound end and a free end, the first portion extending substantially in an upward direction of the terminal and the second portion extending substantially in an axial direction of the terminal.

13. The electric terminal of claim 12, wherein the first portion of the locking lance is mechanically attached on only one side to a side wall, the first portion extends in a central region in a circumferential direction of the electric terminal and merges into the second portion.

14. The electric terminal of claim 13, wherein the second portion of the locking lance extends away from a body of the electric terminal in the upward direction and/or a substantial axial portion of the locking lance is established eccentrically in the electric terminal.

15. The electric terminal of claim 11, wherein the locking lance has a first upward portion extending in an upward direction and a second upward portion extending from the first upward portion in the upward direction and a transverse direction.

16. The electric terminal of claim 15, wherein the second upward portion forms an actual polarization device of the polarization.

17. The electric terminal of claim 15, wherein the locking lance has a first axial portion extending in an axial direction and a second axial portion extending in the axial direction and the upward direction.

18. The electric terminal of claim 1, wherein the wall of the socket of the contact section is an intermediate cover wall defining a top wall of the socket of the contact section.

19. An electric terminal, comprising:

a contact section, including;

a socket defined at least in part by:

an intermediate wall extending in a transverse direction of the terminal;

a first side wall extending vertically downward from the intermediate wall;

a bottom wall extending in the transverse direction from the first side wall; and a second side wall extending vertically upward from the bottom wall; and a locking lance arranged above the socket and adapted to lock the electric terminal in a connector housing of an electric connector, the locking lance defined at least in part by:

a third side wall extending at least partially vertically upward from the second side wall and arranged above the intermediate wall;

a top wall extending in the transverse direction from the third side wall; and a fourth side wall extending vertically downward from the top wall, the fourth sidewall including one of a lug or a recess on a free end thereof and engaging with a corresponding other one of the lug or the recess defined by the intermediate wall or the first side wall and securing the locking lance in an axial direction of the terminal; and a transition section extending from the contact section and having a secondary latching, the secondary latching including first and second circumferential sections extending vertically upward from respective sides of the terminal, ends of the first and second circumferential sections extending inward toward one another in the transverse direction and connected to one another by a plug-in connection.

20. The electric terminal of claim 19, wherein:

the secondary latching device is a latching box, and the plug-in connection is defined on a top side of the latching box; and a reinforcement bead or a reinforcement stamped recess is formed on or into at least one of a vertically extending portion of the first circumferential section or a vertically extending portion of the second circumferential section.

* * * * *